(12) United States Patent
Shingai et al.

(10) Patent No.: US 6,605,328 B2
(45) Date of Patent: Aug. 12, 2003

(54) OPTICAL RECORDING MEDIUM

(75) Inventors: Hiroshi Shingai, Chuo-ku (JP); Hiroyasu Inoue, Chuo-ku (JP); Tatsuya Kato, Chuo-ku (JP); Hajime Utsunomiya, Chuo-ku (JP); Yoshitomo Tanaka, Chuo-ku (JP)

(73) Assignee: TDK Corporation, Tokyo (JP)

( * ) Notice: Subject to any disclaimer, the term of this patent is extended or adjusted under 35 U.S.C. 154(b) by 5 days.

(21) Appl. No.: 09/886,258

(22) Filed: Jun. 22, 2001

(65) Prior Publication Data

US 2002/0015816 A1 Feb. 7, 2002

(30) Foreign Application Priority Data

Jun. 23, 2000 (JP) .......................... 2000-190315
May 10, 2001 (JP) .......................... 2001-140082

(51) Int. Cl.$^7$ ................................ B32B 3/02
(52) U.S. Cl. ................ 428/64.1; 428/64.5; 428/64.6; 430/270.13
(58) Field of Search ................ 428/64.1, 64.4, 428/64.5, 64.6, 913; 430/270.13, 195.1, 945

(56) References Cited

U.S. PATENT DOCUMENTS

| 6,169,722 B1 | 1/2001 | Kikukawa et al. | |
| 6,416,837 B1 * | 7/2002 | Kojima | 428/64.1 |
| 2002/0039634 A1 * | 4/2002 | Mitzushima | 428/64.4 |

FOREIGN PATENT DOCUMENTS

| JP | 64-32438 | 2/1989 |
| JP | 2-35636 | 2/1990 |
| JP | 2-151481 | 6/1990 |
| JP | 4-316888 | 11/1992 |
| JP | 9-71049 | 3/1997 |
| JP | 9-286175 | 11/1997 |
| JP | 10-326436 | 12/1998 |
| JP | 2000-43415 | 2/2000 |
| JP | 2000-52657 | 2/2000 |

OTHER PUBLICATIONS

U.S. patent application Ser. No. 09/883,199, filed Jun. 19, 2001, pending.

U.S. patent application Ser. No. 09/886,258, filed Jun. 2001, pending.

* cited by examiner

Primary Examiner—Elizabeth Mulvaney
(74) Attorney, Agent, or Firm—Oblon, Spivak, McClelland, Maier & Neustadt, P.C.

(57) ABSTRACT

In an optical recording medium comprising a phase change recording layer (4) containing Sb and optionally, Te and/or In as a main component, the recording layer is able to be crystallized to provide a crystallized region which contains rhombohedral crystals consisting essentially of Sb and is substantially free of a crystal phase other than the rhombohedral crystals. When the recording layer contains a rare earth element, Zr, Hf, Ti or Sn as an auxiliary component, the medium has a dielectric layer (31) composed of silicon oxide, silicon nitride, aluminum oxide, or a mixture of zinc sulfide and at least 30 mol % of silicon oxide, disposed contiguous to and in front of the recording layer (4) as viewed from the recording/reading beam incident side. The medium has a high transfer rate and improved thermal stability.

18 Claims, 5 Drawing Sheets

RECORDING/READING BEAM

RECORDING/READING BEAM

OPTICAL RECORDING MEDIUM

This invention relates to a phase change optical recording medium.

BACKGROUND OF THE INVENTION

Great attention is now paid to optical recording media capable of high density recording and erasing the once recorded information for rewriting. Among such rewritable optical recording media, phase change recording media are designed such that recording is performed by irradiating a laser beam to a recording layer to change its crystalline state and reading is performed by detecting the change of reflectivity of the recording layer associated with that state change. The phase change recording media are of greater interest because the drive unit used for their operation may have a simple optical system as compared with that used for magneto-optical recording media.

For the phase change recording layer, calcogenide materials such as Ge—Sb—Te are often used because of a greater difference in reflectivity between the crystalline and amorphous states and a relatively high stability in the amorphous state.

When information is recorded in a phase change optical recording medium, the recording layer is irradiated with a laser beam having a high power (recording power) sufficient to heat the recording layer at or above its melting point. In the region where the recording power is applied, the recording layer is melted and then rapidly cooled, forming a recorded mark in the amorphous state. To erase the recorded mark, the recording layer is irradiated with a laser beam having a relatively low power (erasing power) sufficient to heat the recording layer above its crystallization temperature, but below its melting point. The recorded mark to which the erasing power is applied is heated above the crystallization temperature and then slowly cooled, resuming the crystalline state. Therefore, the phase change optical recording medium allows for overwriting simply by modulating the intensity of a single laser beam.

In order to increase the recording density and transfer rate of a recording medium, attempts have been made to reduce the wavelength of recording/reading beam, to increase the numerical aperture of an objective lens in a recording/reading optical system, and to increase the linear velocity of the medium. When a recording laser beam is irradiated to a medium rotating at a linear velocity V, the recording laser beam defines on the surface of the recording layer a spot having a diameter represented by $\lambda/NA$ wherein $\lambda$ is the wavelength of the laser beam and NA is the numerical aperture of the objective lens. The spot diameter $\lambda/NA$ divided by the linear velocity V, i.e., $(\lambda/NA)/V$ gives the time of irradiation of laser beam to the recording layer, that is, the time taken for passage across a beam spot. As the recording density and transfer rate increase, the irradiation time of laser beam to the recording layer becomes shorter and shorter. This makes it difficult to optimize overwriting conditions.

Problems arising from overwriting at an increased linear velocity are discussed below.

An increased linear velocity leads to a shortened irradiation time of recording laser beam. It is then a common practice to increase the recording power in proportion to the increased linear velocity for preventing the heated temperature of the recording layer from lowering.

On the other hand, to erase the amorphous recorded mark (to recrystallize), an erasing beam must be irradiated such that the recording layer may be held for at least a predetermined time at a temperature between the crystallization temperature and the melting point. The attempt to increase the erasing power in proportion to the increased linear velocity for preventing the heated temperature of the recording layer from lowering has a less likelihood to erase the recorded mark because the irradiation time is reduced as a result of the increased linear velocity.

Therefore, to increase the linear velocity for improving the transfer rate, the recording layer must be formed of a composition having a relatively high crystal transition speed such that recrystallization is completed within a relatively short time (as disclosed in JP-A 1-78444 and JP-A 10-326436).

The recording layer featuring a high crystal transition speed, that is, a short time required for crystallization, however, is thermally less stable. That is, the recording layer suffers from the problem of low storage reliability since it readily crystallizes in a relatively hot environment.

Also, the high transfer rate can be established by such a method as by increasing the linear velocity of the medium or by increasing the linear recording density of the medium. The inventors found that reducing the recorded mark length in order to increase the linear recording density sacrifices the thermal stability of the recorded mark.

SUMMARY OF THE INVENTION

An object of the invention is to provide a phase change optical recording medium having a recording layer with an increased transfer rate and a high thermal stability.

According to the invention, there is provided an optical recording medium comprising a phase change recording layer containing antimony as a main component, the recording layer being able to be crystallized to provide a crystallized region which contains rhombohedral crystals consisting essentially of antimony and is substantially free of a crystal phase other than the rhombohedral crystals.

In one preferred embodiment, the recording layer further contains tellurium and/or indium as a main component.

In another preferred embodiment, the recording layer contains at least one element selected from the group consisting of rare earth elements, zirconium, hafnium, titanium and tin as an auxiliary component, and the medium further comprises a dielectric layer disposed contiguous to said recording layer and in front of said recording layer as viewed from the side where a recording/reading beam enters, the dielectric layer containing silicon oxide, silicon nitride, aluminum oxide, or a mixture of zinc sulfide and silicon oxide, the content of silicon oxide in the mixture being at least 30 mol %.

Function and Results

In the phase change recording layer containing antimony (Sb) as a main constituent component, the crystal transition speed increases as the Sb content increases. On the other hand, the thermal stability of the recording layer lowers as the Sb content increases. To improve thermal stability, it is preferable to reduce the Sb content and instead, add a thermal stability-enhancing element. This, in turn, makes it difficult to increase the crystal transition speed of the recording layer.

In the medium of the invention, the phase change recording layer provides a crystallized region which contains rhombohedral crystals consisting essentially of Sb and is substantially free of a crystal phase other than the rhombohedral crystals. If the crystalline phase included in the phase change recording layer based on Sb contains only rhombohedral crystals consisting essentially of Sb, then this recording layer provides a higher crystal transition speed than a recording layer having the same Sb content and consisting of face-centered cubic (f.c.c.) crystals and also a higher crystal transition speed than a recording layer having the same Sb content and consisting of Sb and $Sb_2Te_3$ phases. Accordingly, the invention is successful in increasing the crystal transition speed without extremely increasing the Sb content. Therefore, the invention entails a phase change optical recording medium capable of overwriting at a high linear velocity and having improved thermal stability.

In one preferred embodiment, at least one element selected from among rare earth elements, Zr, Hf, Ti and Sn is added to the recording layer as an auxiliary component, thereby elevating the crystallization temperature of the recording layer. This ensures that the recorded mark is fully thermally stable even when the recording layer is of a high crystal transition speed composition, and when the recorded mark is made short. The medium is thus improved in storage reliability.

There are known additive elements capable of elevating the crystallization temperature of a recording layer. Most additive elements, however, function to lower the crystal transition speed of the recording layer. In contrast, by adding an auxiliary component element such as rare earth element to the recording layer and at the same time, disposing a dielectric layer of a specific composition contiguous to the recording layer and in front of the recording layer as viewed from the side where a recording/reading laser beam enters the medium, the preferred embodiment of the present invention is successful in improving the thermal stability and increasing the crystal transition speed of the recording layer. The invention medium is advantageous especially in high linear velocity recording.

It is known that rare earth elements may be added to a phase change recording layer containing at least Sb. Some of the patent references to be discussed below describe that rare earth elements are effective for improving the crystallization temperature of recording layers. The patent references below, however, do not describe the recording layer containing only rhombohedral crystals consisting essentially of Sb as the crystal phase. Nor they describe the combination of the addition of rare earth elements with the dielectric layer of the specific composition prescribed by the present invention.

JP-A 2-3113 discloses an information recording thin film formed of $In_{44}Sb_{46}Bi_{10}$ (atomic ratio) by evaporation to a thickness of 100 nm. In Examples thereof, thin films based on this composition to which Nd was added were prepared and measured for phase change temperature. A rise of phase change temperature due to Nd addition was ascertained in this way.

JP-A 2-35636 and 2-151481 disclose phase change information recording thin films containing Sb, Te and other elements. It is described that the crystallization temperature can be elevated by adding rare earth elements or analogues. In Examples thereof, however, no thin films having rare earth elements added were prepared.

JP-A 10-326436 describes that rare earth elements may be added to a phase change recording layer containing Sb and Te. It is described that Zn, Cu, Au, Ag, Pd, Pt, Cr, Co, Zr, Ti, Mn, Mo, Rh and rare earth elements themselves or compounds thereof with Sb or Te have high melting points so that they precipitate as fine dispersed clusters and serve as crystal nuclei, contributing to high speed crystallization. Examples therein lack samples having rare earth elements added. Recording at a wavelength 780 nm, a numerical aperture NA of 0.55 and a linear velocity of 4.8 m/s or below is described in Examples, which indicates that high linear velocity recording as contemplated in the present invention is out of consideration.

JP-A 2000-43415 discloses a phase change recording layer containing Sb and Te and having a metastable $Sb_3Te$ phase belonging to the space group Fm3m. This $Sb_3Te$ phase has a face-centered cubic (f.c.c.) structure as described therein. It is also described that by adding nitrogen, boron, carbon, rare earth element or transition metal element to the recording layer, an improvement is made in the long-term storage of initially recorded data. However, Examples therein lack samples having rare earth elements added. It is also noted that in Examples, the linear velocity for recording is 7 m/s.

JP-A 2000-52657 discloses a phase change recording layer containing Sb, Te, Group Ib element and Group IIIb element and having a metastable phase belonging to the space group Fm3m. This metastable phase is a f.c.c. structure phase as typified by $Sb_3Te$ phase. Although this patent describes that rare earth elements may be added to the recording layer, Examples therein lack samples having rare earth elements added. In Examples, the linear velocity for recording is 8 m/s or below. It is also described that the content of Ag+Au in the recording layer is adjusted in accordance with the linear velocity. Namely, in this patent, compositions free of Ag and/or Au are out of consideration. More specifically, Table 2 in this patent publication describes a recording layer 14 of $Ag_{0.05}In_{0.04}Sb_{0.61}Te_{0.3}$ containing a f.c.c. phase, $Sb_2Te_3$ phase and Sb phase. That is, this recording layer is a mixture of a f.c.c. phase and a rhombohedral crystal phase. It is described that in evaluating the recording layer 14, Sb and $Sb_2Te_3$—which develop as precipitates when the metastable phase is differentiated—precipitate in the recording layer, which is inadequate for high density recording.

JP-A 9-71049 discloses an optical information recording medium having a recording layer consisting of Sb, Te and M wherein M is at least one element of Ag, Cu and Au, wherein these constituent elements are present as $Sb_xTe_{1-x}$ wherein $0.70<x<0.90$ and $(M_zTe_{1-z})_bSb$ wherein $0<z<0.33$ and $0<b<1$. It is described in paragraph 0013 of the patent publication that on X-ray analysis, a sharp peak of Sb rather than that of $Sb_2Te_3$ appears. That is, this recording layer contains both a $Sb_2Te_3$ phase and a Sb phase as crystals, but not a Sb phase alone. Therefore, the recording layer of this patent publication differs from the recording layer of the present invention and fails to achieve the desired effects of the present invention. It is not described in this patent publication that auxiliary component elements as prescribed in the present invention are added to the recording layer.

DESCRIPTION OF THE PREFERRED EMBODIMENT

Figure 1:
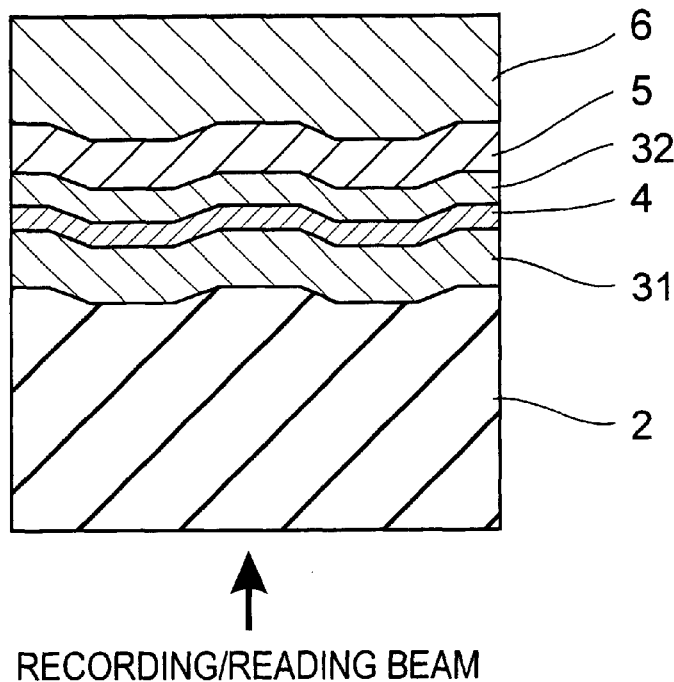
FIG. 1 is a schematic cross-sectional view of a portion of an optical recording medium according to one embodiment of the invention.

The optical recording medium of the invention includes a phase change recording layer which contains antimony (Sb) as a main component. Since use of Sb alone as a main component can result in too low a crystallization temperature and too low thermal stability, it is preferable to use tellurium (Te) and/or indium (In) as an additional main component. Of these, Te is especially preferable because of a possibility to increase the degree of modulation. Also preferably, the recording layer contains at least one element selected from among rare earth elements, zirconium, hafnium, titanium and tin as an auxiliary component. It is noted that the term "rare earth elements" used herein include yttrium (Y), scandium (Sc) and lanthanoids.

Where the atomic ratio of the main component constituent elements is represented by the formula I:

$$Sb_a Te_b In_c$$

wherein a+b+c=1, it is preferred that a range from 0.6 to 0.9, b range from 0 to 0.4, and c range from 0 to 0.4.

In formula I, too small a value of "a" representative of the Sb content may entail a greater reflectivity difference associated with phase change, but a sharp decline of crystal transition speed to impede erasion. On the other hand, with too large values of "a," the crystallization temperature may lower so that the thermal stability of recorded marks is aggravated. Also, too large a value of "a" may entail a smaller reflectivity difference associated with phase change and hence, a lower degree of modulation.

Like Sb, the auxiliary component elements are effective for increasing the crystal transition speed when a dielectric layer of specific composition is disposed in front of the recording layer as viewed from the recording/reading beam incident side. Therefore, by substituting the auxiliary component element(s) for a portion of Sb, the crystal transition speed is increased, and at the same time, the thermal stability of recorded marks is improved. Therefore, the invention medium performs well particularly when operated at a high linear velocity.

The content of the auxiliary component element in the recording layer is preferably up to 30 at %, more preferably up to 25 at %. Too high an auxiliary component element content may lead to too high a crystallization temperature, which hinders to initialize or crystallize an amorphous recording layer immediately after its formation. In order that the auxiliary component element added fully exert the effects of increasing the crystal transition speed and the recorded mark's thermal stability, the content of auxiliary component element should preferably be set at 0.1 at % or above, more preferably 0.5 at % or above.

The preferred auxiliary component elements are rare earth elements since they are more effective for increasing the crystal transition speed and the recorded mark's thermal stability.

In addition to the above-mentioned main and auxiliary components, the recording layer may contain one or more other element if desired. Such an additive element is designated element M wherein M is at least one element selected from among Ag, Au, Bi, Se, Al, P, Ge, H, Si, C, V, W, Ta, Zn, Pb and Pd. Element M is added, if necessary, for achieving any desired effect. For example, at least one of V and Ta is preferably added for the purpose of improving durability against rewriting, more specifically for suppressing any loss of erasability by repetitive rewriting. Also, Ge is preferably added for the purpose of improving thermal stability.

For the purpose of increasing the degree of modulation, it is recommended that the addition of element M be avoided. Even when element M is added, the content of element M in the recording layer should preferably be suppressed to 10 at % or less. Too high an element M content may lead to a small change of reflectivity associated with phase change, failing to provide a degree of modulation.

Preferably the recording layer has a thickness of 2 to 50 nm, more preferably 2 to 30 nm. Too thin a recording layer may impede the growth of a crystal phase, resulting in an insufficient change of reflectivity associated with phase change. A too thick recording layer possesses a large heat capacity which may impede recording, and has a low reflectivity and a low degree of modulation.

The composition of the recording layer can be analyzed by electron probe microanalysis (EPMA), x-ray microanalysis and inductively coupled plasma emission spectroscopy (ICP), for example.

The recording layer is preferably formed by a sputtering process. The sputtering conditions are not critical. When a material containing plural elements is to be deposited by sputtering, an alloy target may be used. A multi-source sputtering process using a plurality of targets is also useful.

The recording layer contains rhombohedral crystals consisting essentially of antimony (Sb). For increasing the crystal transition speed of the recording layer, the invention employs a relatively high Sb content and substantially excludes from the recording layer a crystal phase other than the rhombohedral crystals. The rhombohedral crystals consisting essentially of Sb are present as a phase consisting solely of Sb and an Sb phase forming a solid solution with another element. It is required that at least one of these phases be present in the recording layer. It is noted that by the term "rhombohedral crystals consisting essentially of Sb," a $Sb_2Te_3$ phase is not encompassed.

The presence of rhombohedral crystals consisting essentially of Sb and the substantial absence of another crystal phase can be ascertained by electron beam diffraction and x-ray diffraction. The recording layer substantially free of a crystal phase other than the rhombohedral crystals, as used herein, means that on electron beam diffraction and x-ray diffraction analysis, the crystal phase other than the rhombohedral crystals is not detected.

As long as the above-described composition and crystal phase requirements are met, other factors of the recording layer are not critical. The optical recording medium may have any desired structure as long as it satisfies the composition and crystal phase requirements.

One general construction of the phase change optical recording medium is illustrated in FIG. 1 as comprising a substrate 2, and a first dielectric layer 31, a recording layer 4, a second dielectric layer 32, a reflective layer 5, and a protective layer 6 stacked successively on the substrate 2 in the described order. In this medium, a recording/reading beam is irradiated to the recording layer 4 through the substrate 2.

Figure 2:
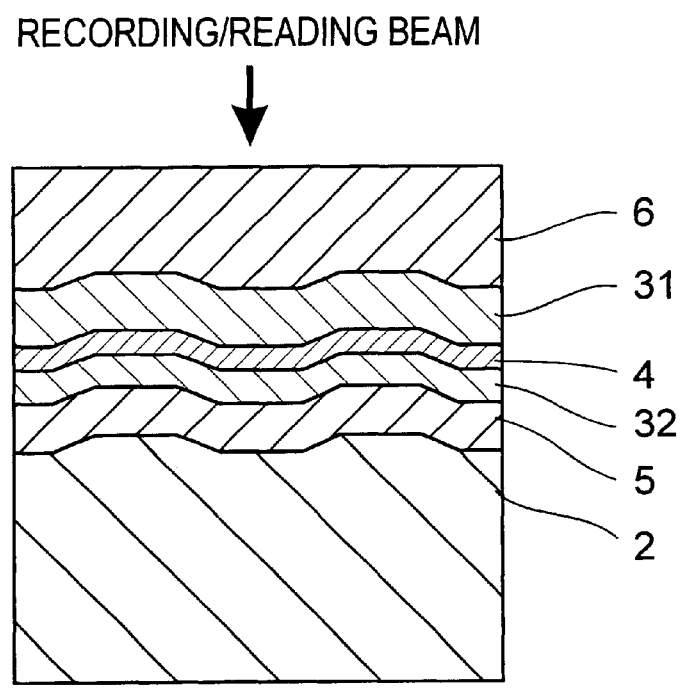
FIGS. 2 to 4 are similar schematic views of optical recording media according to various embodiments of the invention.

Also, the optical recording medium may be constructed as shown in FIG. 2, such that a recording/reading beam is irradiated to the recording layer without passing through the substrate 2. In this embodiment, a reflective layer 5, a second dielectric layer 32, a recording layer 4, a first dielectric layer 31 are stacked on a substrate 2 in the described order, and a protective layer 6 of a light-transmitting material such as resin is finally laid thereon. A recording/reading beam is irradiated to the recording layer 4 through the protective layer 6.

In one preferred embodiment, an auxiliary component element such as rare earth element is added to the recording layer. In order that the auxiliary component element added function to increase the crystal transition speed, the dielectric layer disposed in front of the recording layer as viewed from the recording/reading beam incident side should have a specific composition. This specific composition is a composition containing silicon oxide, silicon nitride, aluminum oxide, or a mixture of zinc sulfide and silicon oxide. The composition should preferably contain at least 30 mol %, more preferably at least 40 mol %, and most preferably 100 mol % of any of these compounds. That is, the most preferred composition is silicon oxide, silicon nitride, aluminum oxide, or a mixture of zinc sulfide and silicon oxide. In the mixture, the content of silicon oxide should be at least 30 mol %, preferably 30 to 70 mol % of the zinc sulfide and silicon oxide combined. If the first dielectric layer disposed in front of the recording layer is outside the specific composition, the crystal transition speed-up effect of auxiliary component element addition is not exerted.

Figure 3:
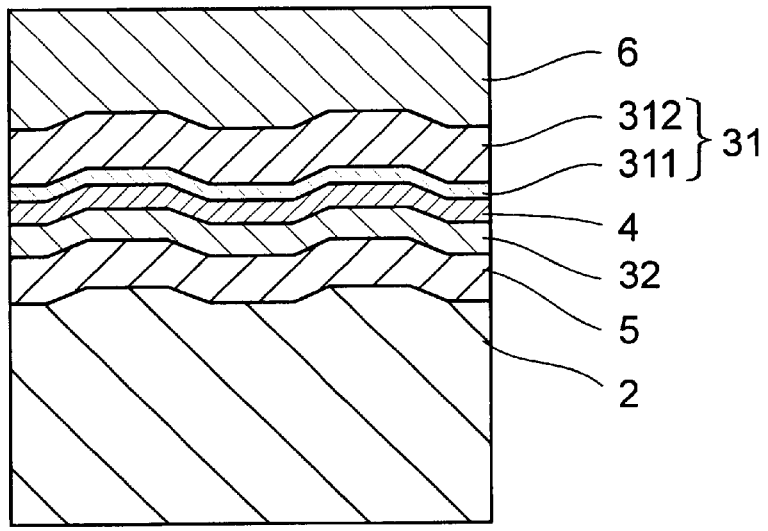

The dielectric layer of the specific composition may be the entirety of the first dielectric layer 31 in FIGS. 1 and 2. Where the first dielectric layer 31 is a laminate of dielectric sublayers, it suffices that at least the dielectric sublayer disposed contiguous to the recording layer 4 has the specific composition. Such an embodiment is illustrated in FIG. 3. The first dielectric layer 31 in the medium shown in FIG. 3 is a laminate of two dielectric sublayers 311 and 312. The medium has the same structure as the medium of FIG. 2 except for the first dielectric layer 31.

The thickness of the first and second dielectric layers 31 and 32 may be determined as appropriate to achieve the effect of protecting the recording layer 4 and the effect of improving the degree of modulation. Usually, the first dielectric layer 31 preferably has a thickness of 30 to 300 nm, more preferably 50 to 250 nm; and the second dielectric layer 32 preferably has a thickness of 5 to 50 nm. In order that the auxiliary component element added function to fully increase the crystal transition speed, the dielectric layer of the specific composition should preferably have a thickness of at least 1.5 nm, with a thickness of 2.5 nm or more achieving the best results. Since the provision of such a thin dielectric layer achieves satisfactory effects, it is not required that the first dielectric layer 31 in its entirety have the specific composition. Then the provision of a dielectric layer of the specific composition does not affect the freedom of optical and thermal design of the first dielectric layer 31 as a whole.

EXAMPLE

Example 1

An optical recording disk sample of the structure illustrated in FIG. 3 was prepared by injection molding polycarbonate into a disk-shaped substrate 2 having a diameter of 120 mm and a thickness of 1.1 mm in which grooves were formed simultaneous with injection molding. On the surface of the substrate 2, a reflective layer 5, a second dielectric layer 32, a recording layer 4, a first dielectric layer 31 and a protective layer 6 were successively formed by the following procedure.

The reflective layer 5 was formed by sputtering in an argon atmosphere. The target used was $Ag_{98}Pd_1Cu_1$ (atomic ratio). The reflective layer was 100 nm thick.

The second dielectric layer 32 was formed by sputtering a target of $Al_2O_3$ in an argon atmosphere. The second dielectric layer was 20 nm thick.

The recording layer 4 was formed by sputtering in an argon atmosphere. It was 12 nm thick. The composition of the recording layer is shown in Table 1.

As the first dielectric layer 31, a dielectric sublayer 311 of 50 mol % ZnS-50 mol % $SiO_2$ and 5 nm thick was first formed in close contact with the recording layer 4. Another dielectric sublayer 312 of 80 mol % ZnS-20 mol % $SiO_2$ and 120 nm thick was then formed on the dielectric sublayer 311. These sublayers were formed by sputtering in an argon atmosphere.

The protective layer 6 was formed by joining a polycarbonate sheet of 100 µm thick to the dielectric layer 31 with a UV-curable adhesive.

The recording layers of the disk samples were initialized or crystallized by means of a bulk eraser. Each disk sample was mounted on an optical recording medium tester where recording was carried out under the following conditions.

laser wavelength: 405 nm,
numerical aperture NA: 0.85,
recording linear velocity: 11.4 m/s
recording signals: single signals having a frequency corresponding to a recorded mark length 692 nm Next, while the disk sample was rotated so as to provide a linear velocity as shown in Table 1, a laser beam at an erasing power level was irradiated thereto. A erasability was determined, with the results shown in Table 1. This measurement was repeatedly carried out while changing the erasing power level. The maximum erasability is reported in Table 1. An erasability of less than 25 dB is regarded to be unerasable.

For the evaluation of thermal stability, samples were prepared by the same procedure as the optical recording disk samples except that slide glass was used as the substrate. These samples were rested on a heating stage. While the sample was heated at 30° C./min, light is irradiated to the recording layer through the substrate. The temperature at which the reflectivity changed was determined and reported as the crystallization temperature of the recording layer. The results are shown in Table 1.

Figure 5:
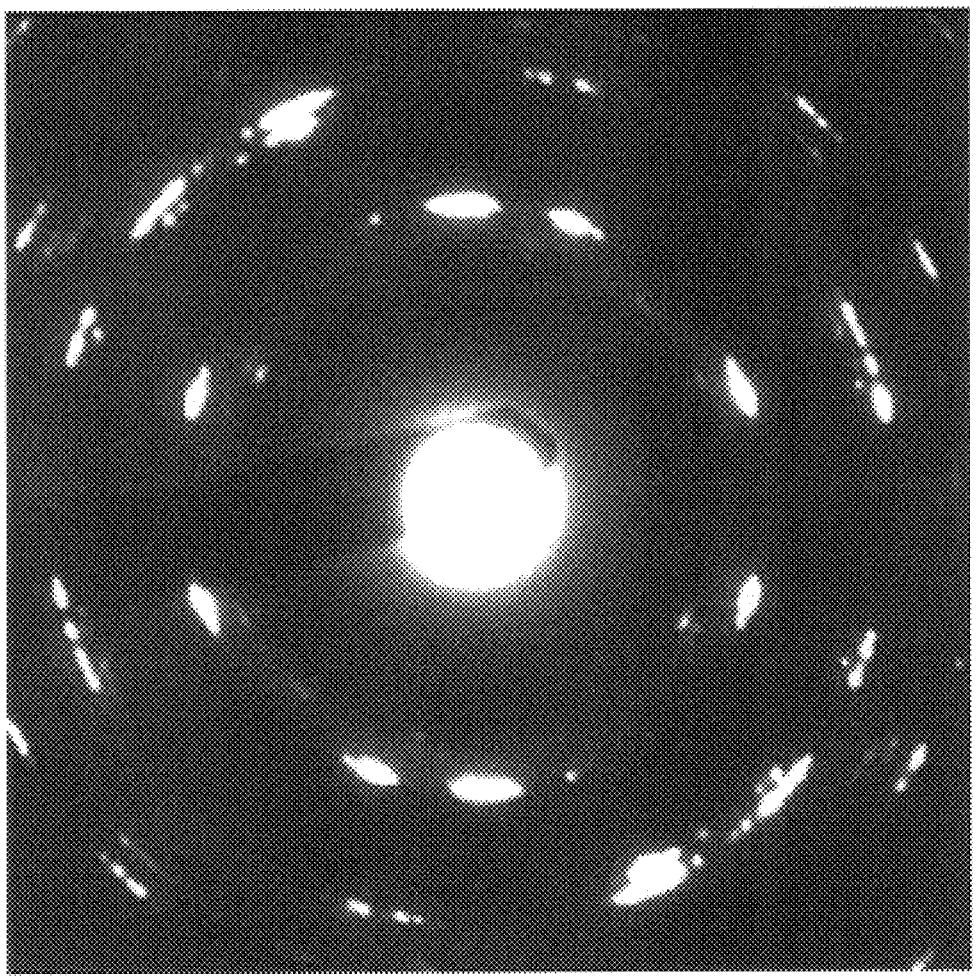
FIG. 5 is an electron beam diffraction pattern of the recording layer of optical recording disk sample No. 4.

By dissolving away the substrate and the layers other than the recording layer from the optical recording disk samples, there were left only the recording layers. The recording layers were examined for crystal phase by performing electron beam diffraction under a transmission electron microscope. As a result, for all the samples, rhombohedral crystals consisting essentially of Sb were detected, but not any crystal phase (e.g., $Sb_2Te_3$ phase) other than the rhombohedral crystals. FIG. 5 shows the electron beam diffraction pattern of sample No. 4 by this type of analysis.

Figure 6:
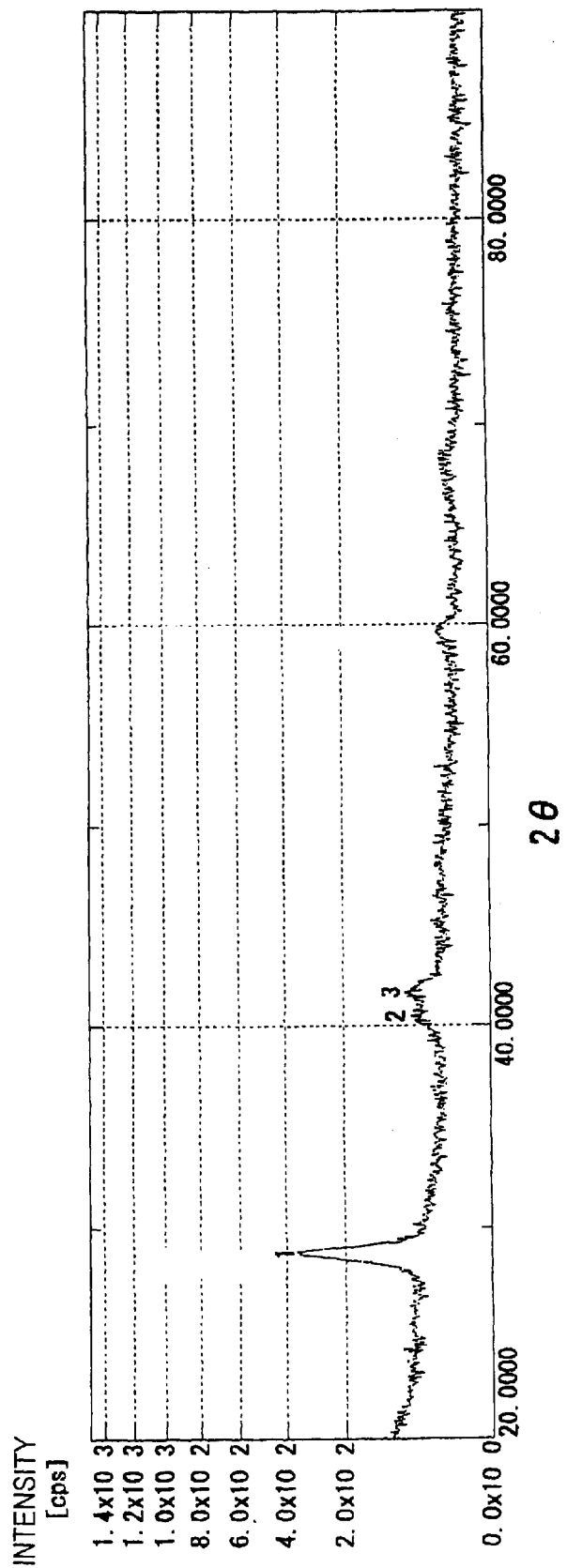
FIG. 6 is an X-ray diffraction pattern of the recording layer of optical recording disk sample No. 4.

The recording layers were also subjected to in-plane diffraction analysis using a thin film x-ray diffractometer ATX-G by Rigaku Denki Co., Ltd. As a result, for all the samples, rhombohedral crystals consisting essentially of Sb were detected, but not any crystal phase (e.g., $Sb_2Te_3$ phase) other than the rhombohedral crystals. FIG. 6 shows the x-ray diffraction pattern of sample No. 4 by this type of analysis.

Figure 7:
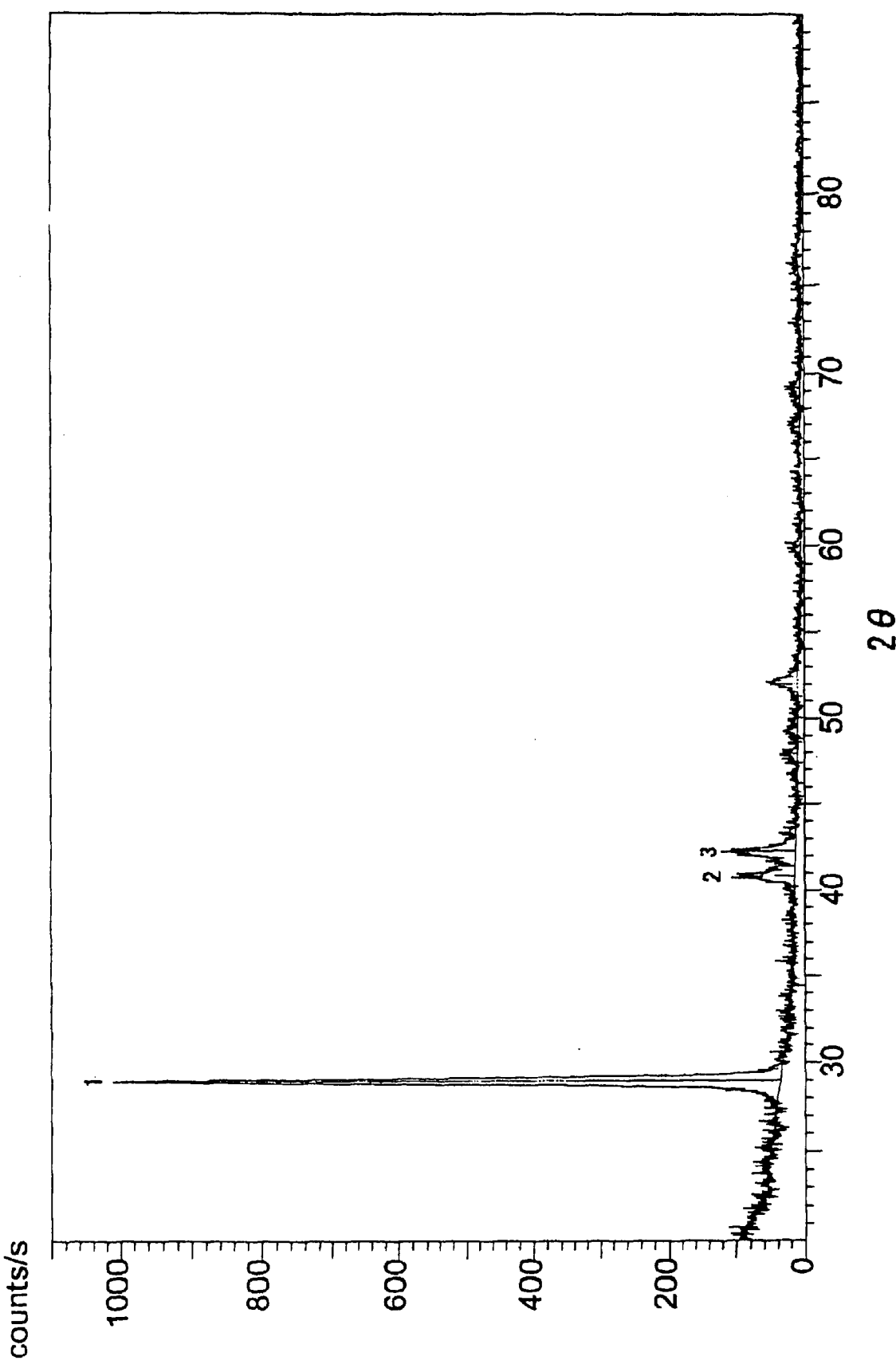
FIG. 7 is an X-ray diffraction pattern of the recording layer of optical recording disk sample No. 4.

Separately, samples for x-ray diffraction were prepared by forming only the recording layers on the surface of the substrates 2. The recording layers were formed by the same procedure as the above optical recording disk samples except that the thickness was 200 nm. These samples were analyzed by x-ray diffraction for examining crystal phases. The crystal phase detected herein was just the same as in the above electron beam diffraction and in-plane diffraction. FIG. 7 shows the x-ray diffraction pattern of sample No. 4 by this type of analysis.

It is noted that in the patterns of FIGS. 6 and 7, all the peaks are attributable to the Sb phase. Judging from the position of each peak, it is believed that the elements other than Sb form a solid solution with the Sb phase. In the patterns of FIGS. 6 and 7, the peaks designated at 1, 2 and 3 correspond to (012), (104) and (110) planes, respectively.

Sample No. 9

An optical recording disk sample No. 9 was prepared by the same procedure as sample No. 8 except that the first dielectric layer 31 had a two-layer structure as shown in FIG. 3. The dielectric sublayer 311 in contact with the recording layer 4 was formed of 80 mol % ZnS-20 mol % $SiO_2$ to a thickness of 68 nm, and the dielectric sublayer 312 was formed of aluminum nitride to a thickness of 100 nm.

Evaluation

TABLE 1

| Sample No. | Recording layer composition (at %) | | | | | | | Erasability (dB) | | | Crystallization temperature (° C.) |
|---|---|---|---|---|---|---|---|---|---|---|---|
| | Sb | Te | In | Ge | Tb | Dy | Gd | Linear velocity 11.4 m/s | Linear velocity 16.3 m/s | Linear velocity 22.8 m/s | |
| 1 | 69.6 | 30.4 | — | — | — | — | — | 33.8 | 13.8 | 4.6 | 163 |
| 2 | 67.3 | 30.3 | — | — | 2.4 | — | — | 37.6 | 26.9 | 8.4 | 184 |
| 3 | 65.6 | 30.4 | — | — | 4.0 | — | — | 37.0 | 33.7 | 28.3 | 230 |
| 4 | 76.0 | 16.9 | 1.1 | 6.0 | — | — | — | 33.6 | 21.8 | 13.8 | 206 |
| 5 | 73.0 | 16.1 | 1.1 | 5.8 | 4.0 | — | — | unmeasurable | 36.5 | 28.0 | 250 |
| 6 | 72.9 | 16.1 | 1.1 | 5.8 | — | 4.1 | — | unmeasurable | 30.1 | 30.9 | 237 |
| 7 | 73.0 | 16.1 | 1.1 | 5.8 | — | — | 4.0 | unmeasurable | 35.0 | 27.6 | 226 |

It is seen from Table 1 that the recording layers containing rhombohedral crystals as the crystal phase achieve a satisfactory erasability even at a high linear velocity of 11.4 m/s or higher. The recording layer of sample No. 4 having Ge added as the auxiliary component shows an elevated crystallization temperature. The recording layers having a rare earth element added as the auxiliary component achieves improvements in both erasable linear velocity and thermal stability.

It is noted in Table 1 that "unmeasurable" under the heading of erasability indicates that recording is impossible because the crystal transition speed of the recording layer is extremely high.

Example 2

Sample No. 8

Figure 4:
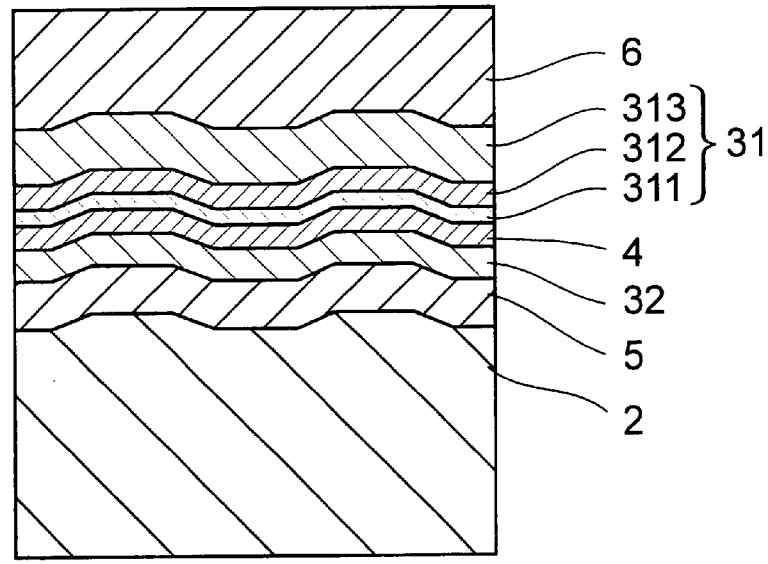

An optical recording disk, sample No. 8, of the structure illustrated in FIG. 4 was prepared by the following procedure. The structure of FIG. 4 is the same as that of FIG. 3 except that the first dielectric layer 31 includes three dielectric sublayers 311, 312 and 313.

The substrate 2 and the reflective layer 5 were the same as in Example 1.

The second dielectric layer 32 was formed by reactive sputtering in a mixed atmosphere of Ar and $N_2$ using an aluminum target. The second dielectric layer was 20 nm thick.

The recording layer 4 was formed by sputtering in an argon atmosphere. It was 12 nm thick. The composition of the recording layer was $Sb_{72.5}Te_{13.7}In_{0.9}Ge_{4.9}Tb_8$ (at %).

The dielectric sublayer 311 in close contact with the recording layer 4 was formed of $Al_2O_3$ to a thickness of 5 nm. The dielectric sublayer 312 was formed of 80 mol % ZnS-20 mol % $SiO_2$ to a thickness of 63 nm. The dielectric sublayer 313 was formed of aluminum nitride to a thickness of 100 nm.

The protective layer 6 was formed by joining a polycarbonate sheet of 100 μm thick to the dielectric layer 31 with a UV-curable adhesive.

The samples prepared above were measured for erasability as in Example 1. The results are shown in Table 2.

TABLE 2

| Sample No. | Dielectric sublayer 311 composition | Erasability (dB) Linear velocity | |
|---|---|---|---|
| | | 22.8 m/s | 27.6 m/s |
| 8 | $Al_2O_3$ | 26.5 | 18.4 |
| 9 | ZnS(80)—$SiO_2$(20) | 8.5 | 5.8 |

It is seen from Table 2 that sample No. 9 in which the dielectric sublayer 311 in contact with the recording layer 4 was formed of 80 mol % ZnS-20 mol % $SiO_2$ has a very low erasability whereas sample No. 8 in which the dielectric sublayer 311 is formed of $Al_2O_3$ has a high erasability. These results demonstrate the effects resulting from the addition of rare earth element Tb to the recording layer 4 and the construction of the dielectric sublayer 311 from the specific composition.

It is noted that on analysis by electron beam diffraction and x-ray diffraction of the recording layer 4 of sample Nos. 8 and 9 as in Example 1, no crystal phase other than the rhombohedral crystals consisting essentially of Sb was detected.

Japanese Patent Application Nos. 2000-190315 and 2001-140082 are incorporated herein by reference.

Reasonable modifications and variations are possible from the foregoing disclosure without departing from either the spirit or scope of the present invention as defined by the claims.

What is claimed is:

1. An optical recording medium comprising a phase change recording layer which comprises antimony as a main component, wherein the recording layer crystallizes to provide a crystallized region which contains rhombohedral crystals consisting essentially of antimony and is substantially free of a crystal phase other than the rhombohedral crystals.

2. The optical recording medium of claim 1 wherein said recording layer further comprises tellurium and/or indium as a main component.

3. An optical recording medium comprising a phase change recording layer which comprises antimony as a main component, wherein the recording layer crystallizes to provide a crystallized region which contains rhombohedral crystals consisting essentially of antimony and is substantially free of a crystal phase other than the rhombohedral crystals, and wherein said recording layer contains at least one element selected from the group consisting of rare earth elements, zirconium, hafnium, titanium and tin as an auxiliary component, and said medium further comprises a dielectric layer disposed contiguous to said recording layer and in front of said recording layer as viewed from the side where a recording/reading beam enters, said dielectric layer containing silicon oxide, silicon nitride, aluminum oxide, or a mixture of zinc sulfide and silicon oxide, the content of silicon oxide in the mixture being at least 30 mol %.

4. The optical recording medium of claim 1, wherein said recording layer further comprises 0.1 to 30 at% of at least one element selected from the group consisting of yttrium, scandium and a lanthanoid as an auxillary component.

5. The optical recording medium of claim 2, wherein the atomic ratio of antimony, tellurium, and indium is represented by the formula I:

$$Sb_aTe_bIn_c$$

wherein $a+b+c=1$, and wherein a ranges from 0.6 to 0.9, b ranges from 0 to 0.4, and c ranges from 0 to 0.4.

6. The optical recording medium of claim 1, wherein said recording layer further comprises one or more elements selected from the group consisting of Ag, Au, Bi, Se, Al, P, Ge, H, Si, C, V, W, Ta, Zn, Pb and Pd.

7. The optical recording medium of claim 1, wherein said recording layer further comprises one or more elements selected from the group consisting of Ge, V, and Ta.

8. The optical recording medium of claim 6, wherein said one or more elements is present at 10 at% or less.

9. The optical recording medium of claim 1, wherein said recording layer has a thickness of 2 to 50 nm.

10. The optical recording medium of claim 1, wherein said recording layer has a thickness of 2 to 30 nm.

11. The optical recording medium of claim 3, wherein in said dielectric layer having a specific composition, the content of silicon oxide, silicon nitride, aluminum oxide, or a mixture of zinc sulfide and silicon oxide is at least 40 mol%.

12. The optical recording medium of claim 3, wherein in said dielectric layer having a specific composition, the content of silicon oxide, silicon nitride, aluminum oxide, or a mixture of zinc sulfide and silicon oxide is 100 mol%.

13. The optical recording medium of claim 3, wherein when said dielectric layer having a specific composition, which comprises a mixture of zinc sulfide and silicon oxide, the content of silicon oxide in the mixture is 30 to 70 mol%.

14. The optical recording medium of claim 3, wherein said medium comprises a laminate of dielectric layers, and said dielectric layer having the specific composition constitutes one of said dielectric layers constituting said laminate.

15. The optical recording medium of claim 3, wherein said medium comprises a dielectric layer of mono- or multi-layer structure wherein said dielectric layer having the specific composition is included as at least one sub-layer, and said dielectric layer of mono- or multi-layer structure has a thickness of 30 to 300 nm.

16. The optical recording medium of claim 3, wherein said medium comprises a dielectric layer of mono- or multi-layer structure wherein said dielectric layer having the specific composition is included as at least one sub-layer, and said dielectric layer of mono- or multi-layer structure has a thickness of 50 to 250 nm.

17. The optical recording medium of claim 3, wherein said medium further comprises a dielectric layer disposed contiguous to said recording layer and in the back of said recording layer as viewed from the side where recording/reading beam enters, and this dielectric layer has a thickness of 5 to 50 nm.

18. The optical recording medium of claim 3, wherein said dielectric layer having the specific composition has a thickness of at least 1.5 nm.

* * * * *

UNITED STATES PATENT AND TRADEMARK OFFICE
CERTIFICATE OF CORRECTION

PATENT NO. : 6,605,328 B2
DATED : August 12, 2003
INVENTOR(S) : Hiroshi Shingai et al.

It is certified that error appears in the above-identified patent and that said Letters Patent is hereby corrected as shown below:

<u>Title page,</u>
Item [75], Inventors, should read

-- [75] Inventors: Hiroshi Shingai, Tokyo (JP);
         Hiroyasu Inoue, Tokyo (JP);
         Tatsuya Kato, Tokyo (JP);
         Hajime Utsunomiya, Tokyo (JP);
         Yoshitomo Tanaka, Tokyo (JP) --

<u>Column 11,</u>
Line 7, "contains" should read -- further comprises --
Lines 14 and 15, "dielectric layer containing" should read -- dielectric layer having a specific composition containing --

Signed and Sealed this

Twenty-seventh Day of April, 2004

JON W. DUDAS
*Acting Director of the United States Patent and Trademark Office*